United States Patent Office 3,488,391
Patented Jan. 6, 1970

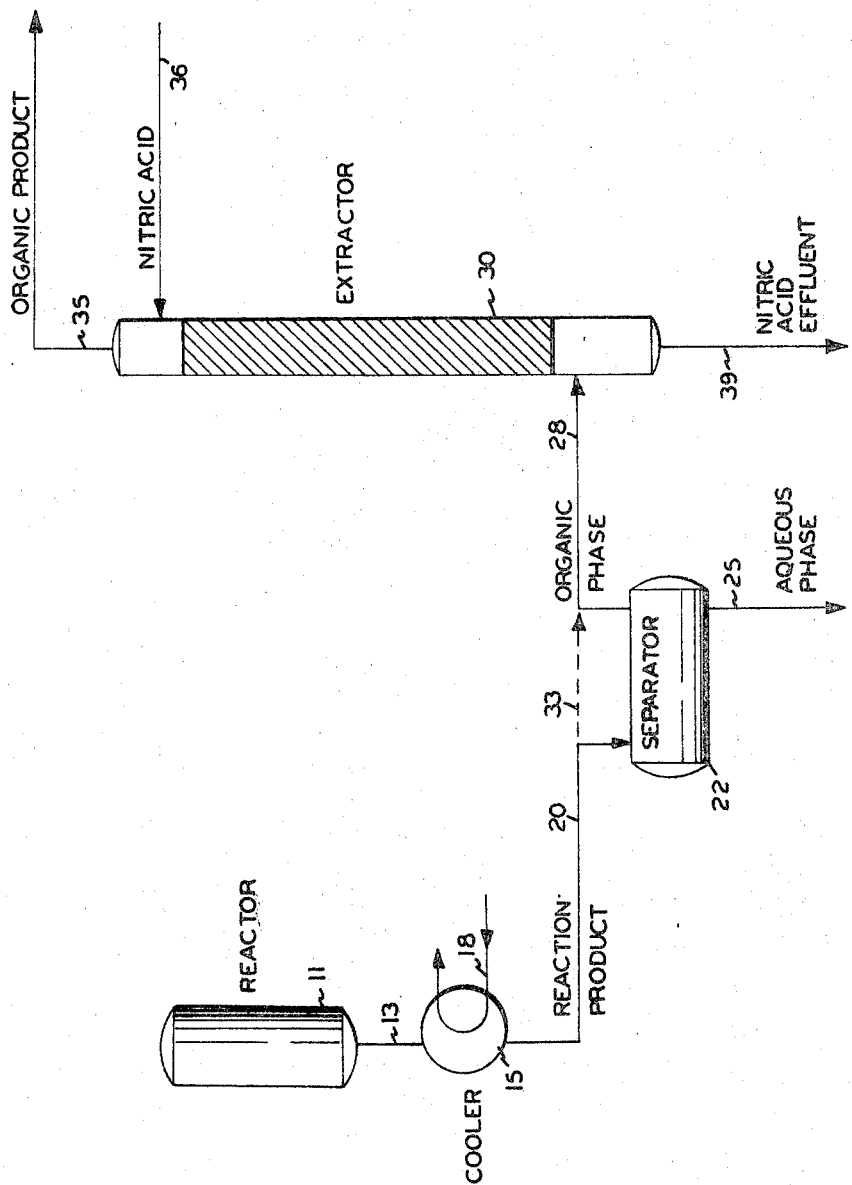

3,488,391
REMOVAL OF ACIDS FROM CYCLOHEXANE OXIDATES
Friedrich Bende, Bergen-Enkheim, and Peter Bonders and Werner Gey, Offenbach (Main), and Hansdieter Hofmann, Petterweil, Germany, assignors to Vickers-Zimmer Aktiengesellschaft Planung und bau von Industrieanlagen, a corporation of Germany
Filed June 14, 1966, Ser. No. 557,416
Int. Cl. C07c 49/30
U.S. Cl. 260—586   5 Claims

ABSTRACT OF THE DISCLOSURE

Process for removing dicarboxylic acids from the reaction mixture obtained in the oxidation of cyclohexane with a molecular oxygen-containing gas, the reaction mixture containing primarily cyclohexanone, cyclohexanol and acids, which process comprises bringing the reaction mixture into intimate contact with an aqueous nitric acid solution to form an organic phase containing primarily cyclohexanone and cyclohexanol and an aqueous nitric acid phase containing dicarboxylic acids and thereafter separating the organic phase from the aqueous phase.

This invention relates to the separation of dicarboxylic acids from primarily non-acid materials containing both mono- and dicarboxylic acids and in particular is directed to the removal of such acids from the product obtained in the oxidation of cyclohexane with molecular oxygen-containing gas. It is now well established in the art that processes for the oxidation of cyclohexane constitute an important phase in the manufacture of nylon intermediates such as adipic acid which is subsequently co-polymerized with hexamethylene diamine to produce a polyamide capable of being spun into a fiber having certain desirable characteristics. Considerable attention has been devoted to the development of an optimum process for oxidizing cyclohexane with molecular oxygen-containing gas to selectively produce a cyclohexanol-cyclohexanone mixture (anolone) containing a minimum of by-products unusable in the adipic acid production. The anolone usually is subjected to a nitric acid oxidation for conversion to the acid. It was discovered that far better overall results are obtained by oxidizing the mixed primary oxidation product directly to adipic acid by means of the nitric acid oxidation procedure without conversion of the alcohol to the ketone.

The product leaving the first oxidation reactor generally will comprise a major amount of anolone and un-reacted cyclohexane, but may also contain substantial quantities of monobasic acids such as formic, acetic and valeric acids; dibasic acids such as adipic, succinic, and glutaric; esters, and cyclohexyl-hydroperoxide, as well as tars, high boiling polymers and water formed during the reaction.

While the presence of dicarboxylic acids in the first oxidation reaction product, especially adipic acid, may be thought advantageous since this is to be the eventual product of the two-stage processing, the presence of acids in the reaction mixture generally should be avoided. As can be readily observed, the acids present in any such reaction mixture can react with the cyclohexanol present, thus affecting the yield of desired cyclohexanol-cyclohexanone. The presence of acids can lead not only to esters of cyclohexanol but they also may catalyze the self-condensation of the cyclohexanone, resulting in lower yields of the desired anolone. Thus, the art generally washes the reaction product immediately with caustic, thereby removing both monobasic and dibasic acids. The dicarboxylic acids can be recovered from the caustic wash effluent only with difficulty.

In this invention, the first oxidation reaction product is contacted with an aqueous nitric acid solution to remove dicarboxylic acids prior to caustic washing.

The process of this invention brings a number of advantages to the overall process of converting cyclohexane to adipic acid. Less caustic is required because less acid needs to be removed from the reaction product in the caustic wash step, substantially only the monocarboxylic acids remaining. Since caustic containing removed acids are of no further use in the process, it is usually considered a waste. The nitric acid solution, however, containing dicarboxylic acids is used as make up diluent for the more concentrated nitric acid solution used in the later conversion of cyclohexanol-cyclohexanone to adipic acid. This fact also shows another advantage of this process; viz, that the dicarboxylic acid need not be independently recovered from the nitric acid wash effluent. As is apparent, it also is not necessary to remove from the nitric acid wash effluent the small amount of anolone which became dissolved or entrained in it during the wash.

Nitric acid has been found to be selective in its action toward dicarboxylic acid, that is, it removes more dicarboxylic acid in proportion to the amount of such acid in the reaction product than it removes of monocarboxylic acid. Besides this effect, nitric acid adds to the efficiency of the total process, as mentioned above, where a wash with another acid or with water would not provide an effluent suitable for mixture with concentrated nitric acid to provide the later oxidation reagent, such effluents providing too much dilution.

The oxidation of cyclohexane is generally carried out at temperatures of about 150 to 180° C., preferably about 160 to 170° C. This temperature may be lower when catalytic material such as heavy metal salts are present in the reaction mixture. The temperature may exceed the range when a greater conversion of cyclohexane than about 15% is desired. The pressure is sufficient to maintain the liquid phase and may often be about 12 to 22 atmospheres. The molecular oxygen-containing gas is usually air.

The nitric acid wash of the reaction products is generally carried out by intimately contacting the wash solution and the liquid to be washed. A counter-current contact procedure is often advisable. The temperature during washing may be up to about 70° C., preferably about 30–50° C. A flow rate of about 1–10 centimeters/second, preferably about 1–5 cm./sec. is advantageous, providing a residence time of about 4–40 minutes for oxidation product in the wash zone. The pressure is sufficient to maintain liquid phase at the temperature employed and may be about 1–5 atmospheres.

The nitric acid generally is provided in an aqueous solution having a concentration of about 10–40% by weight of $HNO_3$ and this solution will be used in amounts of about 1–10% by volume of the organic material coming out of the extraction system. It is important not to use so much water, in proportion to the nitric acid used or the reaction product treated, that the use of the nitric acid wash effluent would cause undue weakening of the nitric acid to be used in the second oxidation reaction. Ordinarily, in this second reaction the nitric acid employed has a concentration of about 30–70%.

Preferably, the reaction effluent is treated before the nitric acid wash to remove an aqueous phase produced in the oxidation reaction. This may be done by gravitational separation, usually under defined pressure conditions. The pressure in the separation zone is usually about 3–7 atmospheres and the maximum temperature will be such as to maintain the liquid phase at this pressure. Operations at fairly high temperatures below this maximum are preferred to provide acids of limited water solubility from crystallizing out of the aqueous phase. The desired temperature in the separation procedure may be obtained by cooling the oxidation product as it leaves the reaction zone. It has been found that at temperatures in the range of about 50 to 120° C. less adipic acid will be removed with the aqueous phase; however, since the aqueous phase is leaner at these temperatures in monocarboxylic acid than at lower temperatures, the aqueous phase removed from the separation may more conveniently be treated for recovery of adipic acid. The aqueous phase removed from the separator has been found to contain some anolone; since the amount of this phase is minor compared to the organic phase, it has been found convenient to send the aqueous phase to the second oxidation step, perhaps mixed with the nitric acid wash effluent.

The invention will be better understood by reference to the accompanying drawing which shows a schematic embodiment of the process of this invention.

In the drawing, 11 is a reactor wherein cyclohexane is contacted with molecular oxygen-containing gas for conversion of some of the hydrocarbon to partially oxidized product. This liquid product, containing primarily cyclohexanol, cyclohexanone and unreacted cyclohexane and including some monobasic acid, dibasic acid, water and other reaction products passes by line 13 through the heat exchanger 15 where it is cooled by indirect contact with a suitable fluid such as water or another liquid being used in connection with the oxidation reactor passing through the coil 18. The cooled oxidizer product passes by line 20 to separator 22 which may be any apparatus suitable for liquid-liquid decantation, centrifugation, etc. The aqueous phase leaves the separator by line 25 whence it may pass to recovery of the cyclohexanol-cyclohexanone contained therein, or to the second oxidation step, etc.

The organic phase passes by line 28 to the extractor 30. Where it is desired not to remove the aqueous phase from the product of the first oxidation reaction, line 33 may be employed to by-pass the separator 22. As shown, line 28 leads to a lower position of the extractor 30, allowing the organic phase to pass upwardly through the extractor 30 to the organic effluent line 35 which conducts the nitric acid-washed product to the next recovery procedure, for example, a caustic wash for further acid removal. Nitric acid solution is fed by line 36, preferably to a point near the top of extractor 30. It is advantageous to use for this purpose a nitric acid solution from the nitric acid recovery part of a nitric acid oxidation procedure. After passage downward in intimate contact with the upflowing organic material, the nitric acid effluent, containing dicarboxylic acid, some anolone, etc., may be removed by line 39 for passage to, for example, the second nitric acid oxidation procedure for the production of adipic acid. To assure intimate contact between the organic phase and the nitric acid extraction solution, the extractor column 30 may be provided with agitators or flow directing members and/or with solid inert contact materials such as glass beads, berl saddles, etc.

The following examples of the process of this invention are to be considered illustrative only and not limiting.

EXAMPLE I

Cyclohexane was oxidized with air at a temperature of 165° C. and a pressure of 18 atmospheres gauge. After gravitational separation to remove an aqueous layer, 3153 parts of the substantially dehydrated reaction product, containing 1.2 grams adipic acid and 8.8 grams monocarboxylic acid per 1000 grams reaction product were extracted counter-current with about 79 parts of a 22% aqueous nitric acid solution at a temperature of about 38° C. The aqueous extract, containing some cyclohexanol and cyclohexanone, and amounting to about 86.2 parts, was sent without further purification to a reactor to produce adipic acid by nitric acid oxidation. The organic effluent contained about 0.1 gram adipic acid and 7.8 grams monocarboxylic acid. Thus, about 1.1 grams per 1000 grams of organic reactor effluent were saved and added to the adipic acid yield of the entire process, which would otherwise have been lost in the caustic wash of the organic product. The total yield increase amounted to about 1.5%.

EXAMPLE II 4624 kg. of a reaction product resulting from cyclohexane oxidation with molecular oxygen-containing gas at a temperature of 170° C. and superatmospheric pressures of 19.5 atmospheres, were purified by cooling to 80° C. under a pressure of one atmosphere to eliminate therefrom 8.8 kg. adipic acid and water of reaction. The organic phase, containing about 4.1 kilograms (0.1%) dissolved adipic acid was sent to an extraction tower. The aqueous nitric acid solution with a concentration of 19.8% was passed at the rate of 432 kg./hr. to the extractor tower counter-current to the organic phase to provide a ratio of about 40/1 organic phase to the said nitric acid solution. The organic phase had an average residence time in the extractor of about 8.33 minutes. The temperature of the extractor was 40° C. and about 94.5% of the adipic acid in the organic phase was removed. The nitric acid effluent amounted to about 115 kilograms and had the following compositions:

| | Percent |
|---|---|
| Water | 73.5 |
| Adipic acid | 3.8 |
| Anolone | 2.0 |
| Nitric acid | 18.6 |
| Monocarboxylic acids | 2.1 |

4236 kilograms of this effluent were passed to contact with 3931 kilograms of nitric acid (based on 100 weight percent) to provide a nitric acid oxidation reagent having a concentration of 48.2%.

What is claimed is:
1. In a process for removing dicarboxylic acids from the reaction mixture obtained in the oxidation of cyclohexane with a molecular oxygen-containing gas, wherein less than about 15% of the cyclohexane is converted, to produce a reaction mixture containing major amounts of unreacted cyclohexane, cyclohexanone and cyclohexanol and minor amounts of monobasic acids, dibasic acids and water, the improvement which comprises:
   (a) bringing said reaction mixture into intimate contact with an aqueous nitric acid extractant solution having a concentration of about 10–40% nitric acid by weight;
   (b) at a temperature of about 30–70° C.;
to form an organic phase containing primarily cyclohexane, cyclohexanone, cyclohexanol and monobasic acids and an aqueous extractant solution phase contain- ing primarily dicarboxylic acids and withdrawing said organic phase and said extractant solution phase.

2. The process of claim 1 in which contact with the nitric acid solution is at a temperature of about 30–50° C.

3. The process of claim 1 wherein the amount of the nitric acid solution is equivalent of about 1–10 percent of the separated organic phase.

4. A process according to claim 1 wherein the water of reaction is separated from the oxidation reaction mixture prior to bringing the mixture into intimate contact with the aqueous nitric acid solution.

5. A process according to claim 4 wherein the water of reaction is allowed to separate at a pressure of about 3–7 atmospheres and at a temperature of 50–120° C.

References Cited

UNITED STATES PATENTS 2,410,642  5/1946  Farkas et al.
2,459,690  1/1949  Doumani et al. _____ 260—533

BERNARD HELFIN, Primary Examiner

M. M. JACOB, Assistant Examiner

U.S. Cl. X.R.

260—533, 631